April 13, 1937.   G. T. HUMPHREY   2,076,818
COUNTERBALANCED CRANK ARM
Filed Oct. 5, 1936
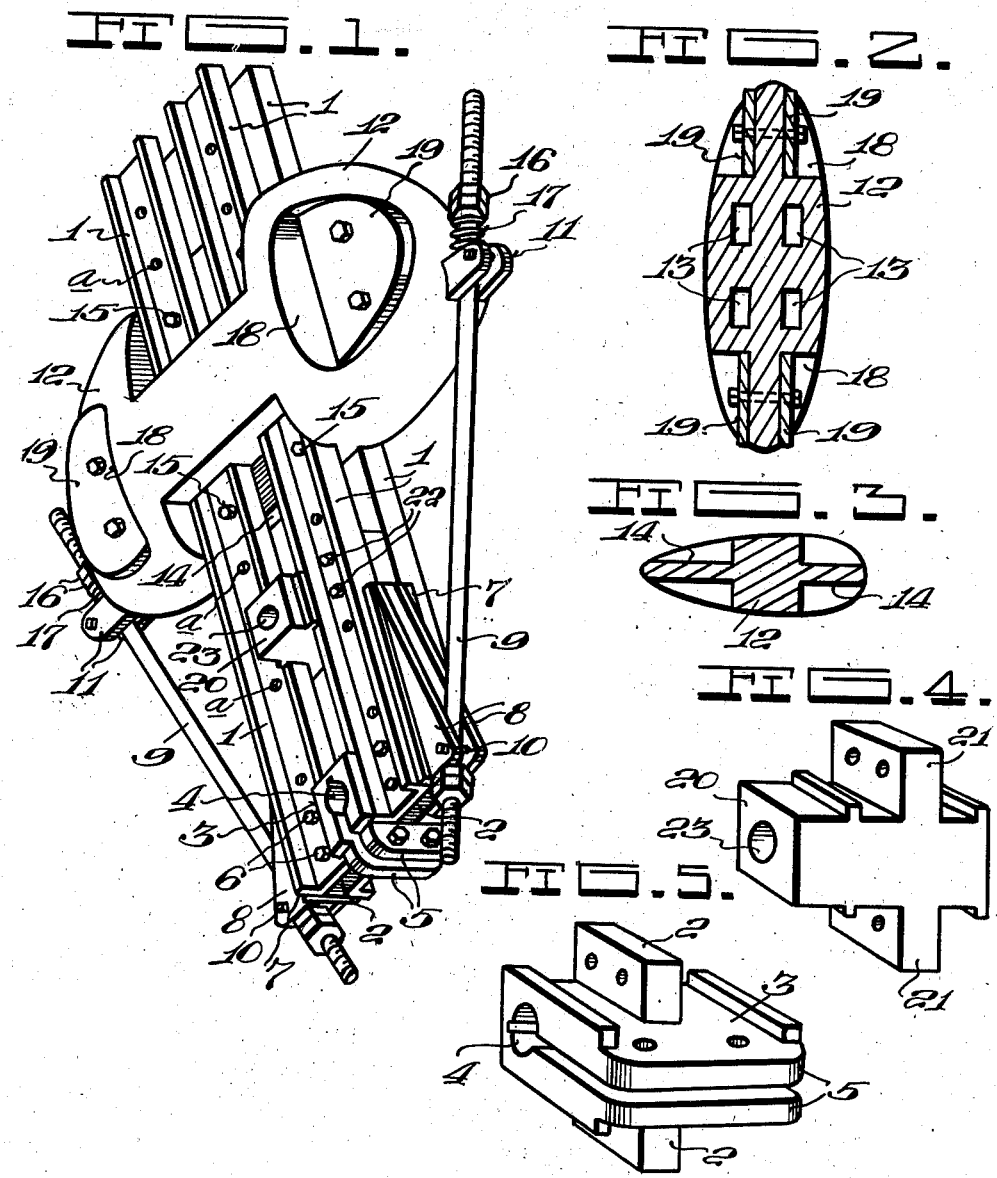
George T. Humphrey
INVENTOR.
BY
ATTORNEY.

Patented Apr. 13, 1937

2,076,818

UNITED STATES PATENT OFFICE 2,076,818

COUNTERBALANCED CRANK ARM

George T. Humphrey, Dallas, Tex.

Application October 5, 1936, Serial No. 104,073

6 Claims. (Cl. 74—591)

This invention relates to well pumping equipment and it has particular reference to certain improvements in counterbalanced cranks for such equipment.

The principal object of the invention is to provide a crank, constructed of steel and is therefore in a measure flexible, the purpose being to promote quicker seating of the well valves, by accelerating movement of the pump rods at the end of each cycle of reciprocation which is effected by the increased impetus given the crank by virtue of its flexibility, as the counterbalance overrides the center of gravity during rotation.

Another object of the invention is to minimize wear upon the teeth of the reduction gearing by relieving them of much of the strain to which they would be otherwise subjected were it not for the flexibility of the crank arm.

Still another object of the invention is to provide a counterbalanced crank in which the weight may be adjusted to accord with varying conditions with the least possible effort. These adjustment also include the change in stroke by simple adjustment of the crank pin bearing block which may be done without requiring that the pitmans be disconnected nor the position of the counterweights disturbed.

The invention further provides among its objects a counterweight whose shape and contour is such as to offer the least possible resistance to air during operation, which is a considerable factor especially in large equipment for deep wells where the circular path of travel of the counterweight is necessarily of considerable radius.

With the foregoing and other objects in view, the invention is set forth in the following description, taken in connection with the accompanying drawing, wherein:

Figure 1 is a perspective view of a counterbalanced crank constructed according to the present invention.

Figure 2 is a sectional view taken through the longitudinal axis of the counterweight, shown in Figure 1.

Figure 3 is transverse section taken through the counterweight midway between its ends.

Figure 4 is a detail view in perspective of the pin block or pitman bearing, and Figure 5 is a detail perspective view of the power shaft bearing.

Continuing with a more detailed description of the drawing, reference is primarily made to Figure 1 in which 1 designates a series of relatively parallel channel irons, rectangularly spaced in transverse section, and joined together at one end by interposing flanges 2 of a bearing block 3, shown in detail in Figure 5. The bearing block 3 is apertured at 4 and split to provide plates 5, which are bolted together after the crank has been mounted on a power shaft (not shown) receivable in the aperture 4. The aperture 4 is grooved, as shown, to receive a key, which latter prevents rotative displacement of the block on the shaft. Bolts 6 serve to hold the block 3 and channel irons 1 in assembled relationship.

On either side of the channel iron crank, there is affixed, by means of welding or otherwise, plates 7, having parallel ears or projections 8, between which lie rods 9. Bolts or equivalent means 10 prevent displacement of these rods from their proper position shown in Figure 1. These rods extend outwardly at an angle with respect to the sides of the crank and are disposed to lie between pairs of ears 11, carried by or cast integral with the counterweight 12, which is constructed for adjustment along the length of the channel iron crank, as shown.

The counterweight 12 is cast in a single piece, as shown, and its ends and sides are symmetrical, the ends being shaped in the manner of the showing in Figure 3, that is, to offer the least possible resistance to air pressure in operation. Transversely through the center of the casting, there is provided apertures 13, conforming in shape to that of the four channel irons 1, as shown in Figure 2, and intermediate the weighted ends of the casting, flattened portions 14 are defined and it is through these flattened portions that bolts 15 are passed which secure the counterweight in adjusted positions to the channel members 1, comprising the crank arm. It will be observed that the channel members 1 are provided with spaced apertures $a$ to make this adjustment possible.

It is not necessary to remove the counterweight 12 to enable adjustments to be made nor it is necessary to employ the efforts of more than one workman for this purpose. It is simply necessary to remove the bolts 15, securing the counterweight 12 to the crank arm, let up or tighten nuts 16 on the threaded ends of rods 9 next adjacent the counterweight 12, which bear on springs 17. By thus adjusting nuts 16, the counterweight is moved either toward or away from the outer end of the crank and when proper position thereof is established, bolts 15 are reinserted and secured.

With further reference to the specific construction of the counterweight 12, it will be noted that recesses or cavities 18 are provided in the casting on either side of the projecting ends. These cavities are for the purpose of receiving interchangeable weights 19, which are effective in bringing about minor changes in balance differentials not obtainable by the master counterweight 12.

From the foregoing it is apparent that the elements of the crank, namely the channel irons 1, being of steel, they have the prerequisite "whip" or flexibility necessary to obtain the desired results outlined. Moreover, the counterweight 12 is capable of being passed over the ends of the channel irons to operative position and secured in adjusted positions along the length of the crank arm. The rods 9 are for the dual purpose of providing means to adjust the counterweight and to supplement the bolts 15 as a holding means to resist centrifugal force during operation of the unit, likely to displace the counterweight.

The springs 17, underlying the nuts 16, threadedly mounted on the ends of the rods 9, allow for a certain amount of flexibility which must be provided to enable the crank to yield to the weight and rotation of the power shaft, to insure the effects previously described, that is, proper seating of the well valves and the protection of the reduction gears from undue wear.

In addition to the foregoing, the invention provides a pin block or bearing 20, shown in detail in Figure 4. This block is provided with flanges 21, interposed between pairs of channel irons 1, making up the crank arm. The apertures $a$, providing for the adjustment of the counterweight 12, continue along the length of the channel irons and afford means for receiving bolts 22, by which the pin block 20 is held relative to the channel irons 1 in adjusted positions.

The aperture 23 (Figure 4) in the pin block 20 is provided to receive the pin in the pitman arm, (not shown) by which the crank arm is joined pivotally to the walking beam of a well pumping unit. It is apparent that stroke adjustments can be made by simply removing the bolts 22, securing the pin block 20, changing the position of the block relative to the apertures $a$, and resecuring the same in a new position. This adjustment is made simple by the construction of the invention and need not require the services of more than one operator, nor does it require that the pitman be disconnected from the block.

Manifestly, the construction as shown and described is capable of some modification and such modification as may be construed within the scope and meaning of the appended claims is also considered to be within the spirit and intent of the invention.

What is claimed is:—

1. A counterbalanced crank for well pumping units, including an inherently flexible crank element composed of a series of steel beams in parallel relationship having a fixed pivotal bearing at one end, a counterweight adjustable along the length of said crank element, adjustable means resiliently restraining said counterweight against displacement by centrifugal force during operation of said crank, a crank pin block disposed between said counterweight and pivotal bearing for adjustment longitudinally of said crank element and interchangeable means for loading said counterweight.

2. A counterbalanced crank for well pumping units, comprising a crank arm composed of a series of relatively parallel channel members and a counterweight in a single piece slidably mounted on said crank arm and whose major axis intersects the longitudinal axis of said crank arm.

3. A counterbalanced crank for well pumping units, comprising a crank arm composed of a series of relatively parallel channel members and a counterweight in a single piece slidably mounted on said crank arm and whose major axis intersects the longitudinal axis of said crank arm, means on either side of said crank arm, connected to the latter and to the ends of said counterweight for effecting adjustment of the latter on said crank arm.

4. A crank arm for a well pumping unit comprising a series of relatively parallel channel members having a fixed pivotal bearing at one end, a counterweight in a single piece, slidably disposed on said channel members and whose ends overreach the sides of said crank arm, and capable of being fixed in adjusted positions thereon.

5. A crank arm for a well pumping unit comprising a series of relatively parallel channel members having a fixed pivotal bearing at one end, a counterweight in a single piece, slidably disposed on said channel members whose ends overreach the sides of said crank arm, and capable of being fixed in adjusted positions thereon and means resiliently connecting the overreaching ends of said counterweight to a point on said crank arm adjacent its pivotal bearing for effecting adjustment of said counterweight longitudinally of said crank arm.

6. A counterbalanced crank for well pumping equipment comprising an inherently flexible arm element having a fixed pivotal bearing and an adjustable block apertured for the reception of a pitman pin, a single piece counterweight whose major axis is transverse with respect to that of said crank and is capable of sliding movement thereon, means for yieldingly tying the ends of said counterweight to said crank at a point adjacent its pivotal bearing and means for adjusting said latter means.

GEORGE T. HUMPHREY.